July 29, 1947.  T. HANSON  2,424,658
FISH STRINGER
Filed April 17, 1946
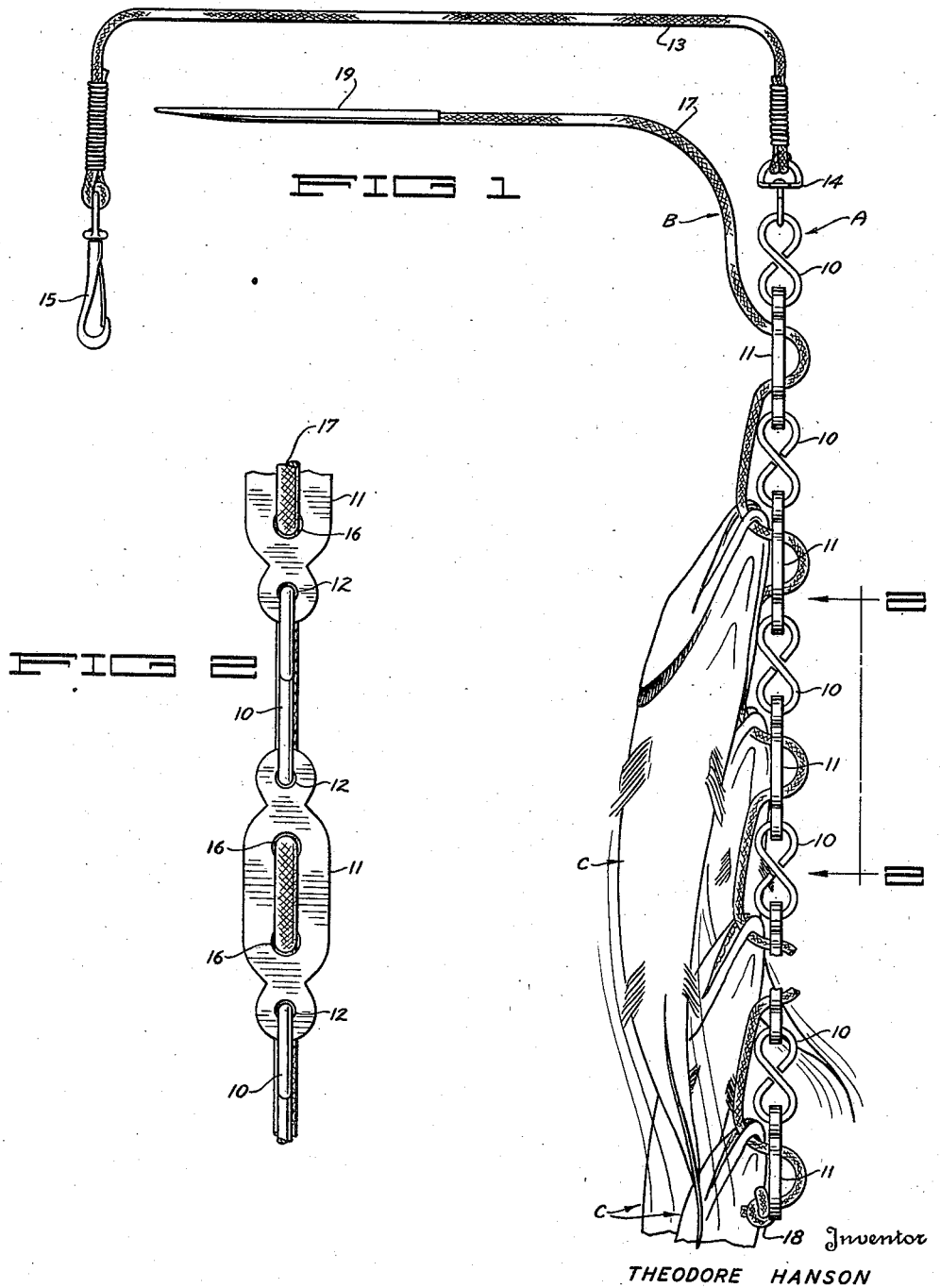
Inventor
THEODORE HANSON
By Carlsen + Hazle
Attorneys Patented July 29, 1947

2,424,658

UNITED STATES PATENT OFFICE 2,424,658

FISH STRINGER

Theodore Hanson, Minneapolis, Minn.

Application April 17, 1946, Serial No. 662,850

6 Claims. (Cl. 224—7)

1

This invention relates to improvements in stringers for keeping fish after they are caught and until they are cleaned.

Several types of stringers for this purpose are widely known and used but all, to my knowledge, have some disadvantages which it is the purpose of my invention to overcome. Possibly the most common stringer comprises merely a suitable length of cord or light rope having an eye at one end and a needle affixed to its other end. In use, the needle is thrust through the lips of the fish first caught and then through the eye forming a loop about the fish's lips after which the fish is dropped into the water and the needle end of the rope tied to the boat or other support. Then as the other fish are caught they are strung in succession but each time a fish is caught the stringer must be unfastened, making the task disagreeable. Then too, the entire weight of the string of fish is placed on the stringer and if the fish are large the stringer is sometimes broken when the fish are lifted from the water. Another common type of stringer has a series of "safety pins" or clasps strung along a chain or cord and while this stringer has the advantage that it need not be detached from the boat each time a fish is caught, the construction is usually such that the fish may obtain such leverage on the pins or clasps that they frequently become unfastened and escape.

Having in mind the foregoing facts it is the primary object of my invention to provide a stringer which will safely keep even very large fish, will keep them in a live condition, and permit successive fish to be strung without detaching the accumulated string from the boat. Thus not only is time saved but the possibility of the string of fish slipping away or dropping from the hands is successfully overcome. Another object is to provide a fish stringer having two parts or sections one of which is secured to the boat at the outset and remains so fastened until the fishing is over, and a second part, or stringer proper, upon which the fish are successively strung but which is threaded back and forth or "sewed" through the other member so that the latter takes the load of the accumulated string of fish.

These and other more detailed and specific objects will be disclosed in the course of the following specification, reference being had to the accompanying drawings, in which—

Fig. 1 is a side elevation of my improved stringer, with a section broken out to permit the showing on a larger scale than would otherwise be possible, and illustrating the manner in which the stringer is used.

Fig. 2 is an enlarged elevational view of a part of the stringer viewing it along the line 2—2 in Fig. 1.

Referring now more particularly and by reference characters to the drawing, A and B designate generally the two separable members or parts from which my stringer is made.

The part A is formed of a length of chain and acts as the carrier or messenger for the part B, which constitutes the actual stringer upon which the fish, indicated at C, are fastened as they are caught. The chain part is made up of a series of alternately arranged figure-of-eight connecting links 10 and flat threading or locking links 11, the ends of which have apertures 12 through which the loops of the link 10 are fastened as clearly shown. Thus a flexible length of chain is formed and at one end an anchoring rope 13 is attached by a swivel 14 to an end link 10 and the other end of this rope is provided with a snap 15 by which the chain may be readily attached to a boat or other support (not shown). The opposite or lower end of the chain terminates in one of the flat links 11 and it will be noted that all of these links 11 are provided with spaced apertures indicated at 16.

The stringer member B takes the form of a length 17 of heavy cord or light rope having one end knotted, as at 18, and its other end fitted with a needle 19 of the type used in such devices. The diameters of the rope 17 and needle 19 are such that they may readily pass through the apertures 16 in the links 11.

In use, at the outset the chain member A is attached by its rope 13 to the boat or other support with the stringer member B threaded through the lowermost aperture 16 in the bottom link 11 and then back through the next aperture in that link, thus drawing the knot 18 up against the link and fastening the two members A and B together. As a matter of fact the two members will usually be carried thus connected at their lower ends and when the rope 13 is fastened to the boat the stringer is ready for use. Now when a fish is caught the needle 19 is thrust through its lip, or lips, and the fish is allowed to slip down the stringer 17 until it comes to rest at the bottom of the stringer or near the lower link 11. Without unfastening the rope 13 then the stringer needle 19 is threaded or "sewed" through the apertures 16 in the next link 11 up the chain, bringing it back through on the same side from which it was started, and the needle end of the stringer may then be dropped back in the boat ready for the next fish, as the first fish is dropped into the water. This action is repeated each time a fish is caught and it will be apparent that, by making the chain of appropriate length and with any desired number of the links 11, any usual number of fish may be strung.

As each fish is strung and the stringer 17 passed back and forth through the link 11 next in line the bend thrown in the stringer and frictional lock obtained upon it by the links 11 will prevent the stringer from working loose by the threshing of the fish or its weight. Furthermore it will be evident, and this is important, that the weight of only each individual fish is thrown on the loops of the stringer between the links 11 and that thus there is little likelihood of its breaking. The weight of the accumulated string of fish, on the other hand, is taken by the chain member A which may be heavy enough, as is also the rope 13, to bear the strain of even a string of very large size. It will be understood in this connection that it is desirable that the caliber of the stringer element itself be kept fairly small, since it is easier to string the fish and they are kept alive to better advantage. I obtain this desired result by providing the strength necessary to support the aggregate weight of fish in the member B, which acts as a support or messenger for the stringer per se, and frees it of this relatively great strain.

To release or detach the fish for cleaning the stringer 17 is, of course, merely pulled out of the links 11 one at a time and the fish withdrawn in succession.

Since the fish are well spaced at their mouths along the stringer by the distance between the links 11 and are permitted some freedom of movement they will stay alive for a considerable time, as is very desirable and as will be readily understood.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. A fish stringer comprising an elongated supporting member having a series of openings along its length and adapted to be fastened at one end to a support, a flexible stringer member attached at one end to the end of the supporting member opposite the end thereof fastened to said support, and said stringer member being adapted to be threaded through the mouth of each fish as it is caught and then sewed once through a pair of the openings in the supporting member to hold each fish thereto.

2. A fish stringer of the character described, comprising in combination, an elongated flexible supporting member having means at its upper end for fastening it to a support, a flexible stringer attached at one end to the lower end of the supporting member and having a needle at its other end for stringing the fish, and said supporting member having spaced pairs of apertures through which the needle end of the stringer may be passed to sew the stringer to said supporting member forming separate loops in the stringer for each fish.

3. A fish stringer of the character described, comprising in combination, an elongated flexible supporting member having means at its upper end for fastening it to a support and including a series of flexibly connected links, a flexible stringer attached at one end to the lower end of the supporting member, and the links in said supporting member having spaced apertures through which the other end of the stringer is adapted to be passed as each fish is strung to fasten the fish to said supporting member.

4. A fish stringer of the character described, comprising in combination, a supporting member having means at its upper end for fastening it to a support, a flexible stringer attached at one end to the lower end of the supporting member and having a needle at its other end for stringing the fish, and said supporting member having spaced pairs of apertures through which the stringer member is adapted to be passed forth and back as each fish is strung and a frictional grip thereby obtained on the stringer to hold each fish to the supporting member.

5. In a fish stringer of the character described, a supporting chain having means at its upper end for fastening it to a boat including a series of links having spaced apertures, a flexible stringer attached at its lower end to the lower end of the chain and having a needle at its other end for stringing the fish, and said stringer being adapted as each fish is strung to be threaded back and forth through the apertures in one of said links to form a loop to hold the fish and to lock said loop against pulling out by the weight and movement of the fish.

6. In a fish stringer, a length of chain having a rope at its upper end for attachment to a boat or other support, said chain having a series of connected flat links each having a pair of openings, a stringer of flexible cord attached at its lower end to the lower end of the chain and having a needle at its other end for threading through the lips of the fish, and said stringer as each fish is caught being adapted to be passed at its said other end back and forth through the apertures in one of said links to attach the fish to the chain without detaching its upper end from said support.

THEODORE HANSON.

REFERENCES CITED

The following references are of record in the file of this patent:

UNITED STATES PATENTS

| Number | Name | Date |
|---|---|---|
| 827,855 | Farmer | Aug. 7, 1906 |
| 2,407,172 | McMillan | Sept. 3, 1946 |